(12) United States Patent
Oles et al.

(10) Patent No.: US 7,429,152 B2
(45) Date of Patent: *Sep. 30, 2008

(54) UNCOATED CUTTING TOOL USING BRAZED-IN SUPERHARD BLANK

(75) Inventors: Edward J. Oles, Ligonier, PA (US); Alfred S. Gates, Jr., Greensburg, PA (US); Kent L. Reiner, Latrobe, PA (US); William M. Alexander, IV, North Huntingdon, PA (US); Jean-Pierre Genain, Beychac et Cailleau (FR)

(73) Assignee: Kennametal Inc., Latrobe, PA (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/463,467

(22) Filed: Jun. 17, 2003

(65) Prior Publication Data

US 2004/0258944 A1 Dec. 23, 2004

(51) Int. Cl.
*B23B 27/22* (2006.01)
*B23P 15/28* (2006.01)
*B23K 31/00* (2006.01)

(52) U.S. Cl. .................. 408/145; 407/32; 407/115; 51/309; 428/627; 228/122.1

(58) Field of Classification Search .................. None
See application file for complete search history.

(56) References Cited

U.S. PATENT DOCUMENTS

| | | | |
|---|---|---|---|
| 1,956,233 A | 4/1934 | Braun | |
| 3,136,633 A * | 6/1964 | Berry | 420/508 |
| 3,743,489 A | 7/1973 | Wentorf, Jr. et al. | 51/307 |
| 3,745,623 A | 7/1973 | Wentorf, Jr. et al. | 29/95 B |
| 4,063,909 A | 12/1977 | Mitchell | 51/309 R |
| 4,186,628 A | 2/1980 | Bonnice | |
| 4,225,322 A | 9/1980 | Knemeyer | 51/295 |
| 4,319,707 A | 3/1982 | Knemeyer | 228/46 |
| 4,459,264 A * | 7/1984 | Mizuhara | 420/505 |
| 4,527,998 A * | 7/1985 | Knemeyer | 51/309 |
| 4,536,442 A | 8/1985 | Bovenkerk et al. | 428/323 |
| 4,591,535 A | 5/1986 | Mizuhara | |

(Continued)

FOREIGN PATENT DOCUMENTS

EP     0299740     7/1988

(Continued)

OTHER PUBLICATIONS

PCT Invitation to Pay Additional Fees for International Appl. No. PCT/US2004/017990 (2 pages).

(Continued)

*Primary Examiner*—Kiley Stoner
(74) *Attorney, Agent, or Firm*—John J. Prizzi (57) ABSTRACT

An uncoated cutting tool that comprises a body containing a pocket. A polycrystalline cubic boron nitride blank has a cutting tip. The blank is brazed into the pocket using a braze alloy whereby there is a braze joint between the body and the polycrystalline cubic boron nitride blank. The braze alloy has a liquidus temperature of at least about 900 degrees Centigrade wherein the braze alloy is selected from the group comprising a nickel-gold braze alloy containing nickel and gold, a copper-gold braze alloy containing copper and gold, a silver-titanium braze alloy containing silver and titanium, and a silver-palladium braze alloy containing silver and palladium.

26 Claims, 6 Drawing Sheets

U.S. PATENT DOCUMENTS

| | | | |
|---|---|---|---|
| 4,647,546 A | 3/1987 | Hall, Jr. et al. | 501/96 |
| 4,650,776 A | 3/1987 | Cerceau et al. | 501/96 |
| 4,690,876 A | 9/1987 | Mizuhara | |
| 4,702,649 A | 10/1987 | Komanduri | 407/119 |
| 4,714,385 A | 12/1987 | Komanduri | 407/119 |
| 4,772,294 A | 9/1988 | Schroeder | 51/309 |
| 4,787,466 A | 11/1988 | Tomlinson et al. | 175/329 |
| 4,850,523 A | 7/1989 | Slutz | 228/121 |
| 4,859,531 A | 8/1989 | Tsuji et al. | 428/333 |
| 4,883,218 A | 11/1989 | Dunn et al. | |
| 4,931,363 A | 6/1990 | Slutz et al. | 428/408 |
| 4,936,717 A | 6/1990 | Bosek | 407/31 |
| 4,944,772 A | 7/1990 | Cho | 51/293 |
| 4,954,139 A | 9/1990 | Cerutti | 51/293 |
| 4,985,050 A | 1/1991 | Cerutti | 51/293 |
| 5,037,704 A | 8/1991 | Nakai et al. | |
| 5,038,645 A | 8/1991 | Walter et al. | 82/1.11 |
| 5,049,164 A | 9/1991 | Horton et al. | 51/295 |
| 5,055,361 A * | 10/1991 | Dunn et al. | 428/633 |
| 5,079,102 A | 1/1992 | Tanaka et al. | 428/627 |
| 5,100,269 A | 3/1992 | Lyon et al. | 407/107 |
| 5,129,918 A | 7/1992 | Chattopadhay | 51/295 |
| 5,255,475 A | 10/1993 | Kotthaus | 51/206 P |
| 5,340,012 A | 8/1994 | Beeferman et al. | |
| 5,366,522 A | 11/1994 | Nakamura et al. | |
| 5,389,118 A | 2/1995 | Hinterman et al. | 51/295 |
| 5,429,459 A | 7/1995 | Palm | 409/66 |
| 5,503,913 A | 4/1996 | König et al. | 428/216 |
| 5,512,235 A | 4/1996 | Cerutti et al. | 419/10 |
| 5,523,158 A | 6/1996 | Kapoor et al. | |
| 5,544,713 A | 8/1996 | Dennis | 175/434 |
| 5,560,754 A | 10/1996 | Johnson et al. | 51/297 |
| 5,564,511 A | 10/1996 | Frushour | 175/431 |
| 5,630,479 A | 5/1997 | Dennis | 175/426 |
| 5,639,285 A | 6/1997 | Yao et al. | 51/307 |
| 5,691,260 A | 11/1997 | Suzuki et al. | 501/96 |
| 5,697,994 A | 12/1997 | Packer et al. | 51/309 |
| 5,709,907 A | 1/1998 | Battaglia et al. | 427/126.1 |
| 5,722,803 A | 3/1998 | Battaglia et al. | 407/119 |
| 5,773,140 A | 6/1998 | Cerutti et al. | 428/332 |
| 5,830,813 A | 11/1998 | Yao et al. | 501/87 |
| 5,848,348 A | 12/1998 | Dennis | 419/5 |
| 5,868,885 A | 2/1999 | Crockett et al. | 156/89.27 |
| 5,882,777 A | 3/1999 | Kukino et al. | 428/216 |
| 5,887,580 A | 3/1999 | Eyre | 126/36 |
| 5,985,228 A | 11/1999 | Corrigan et al. | 423/290 |
| 6,041,875 A | 3/2000 | Rai et al. | 175/432 |
| 6,063,333 A | 5/2000 | Dennis | 419/6 |
| 6,068,913 A | 5/2000 | Cho et al. | 428/212 |
| 6,090,476 A | 7/2000 | Thysell et al. | 428/216 |
| 6,155,755 A * | 12/2000 | Kanada et al. | 407/118 |
| 6,161,990 A | 12/2000 | Oles et al. | |
| 6,170,368 B1 | 1/2001 | Oles et al. | |
| 6,358,428 B1 | 3/2002 | Leverenz et al. | |
| 6,528,123 B1 | 3/2003 | Cadden et al. | |
| 6,742,970 B2 * | 6/2004 | Oles et al. | 407/113 |
| 2001/0050280 A1 * | 12/2001 | Yamada et al. | 219/543 |
| 2002/0014232 A1 | 2/2002 | Garcia et al. | |
| 2004/0256442 A1 * | 12/2004 | Gates et al. | 228/141.1 |
| 2004/0258491 A1 * | 12/2004 | Penkert | 407/113 |

FOREIGN PATENT DOCUMENTS

| | | |
|---|---|---|
| EP | 0 474 092 A2 | 3/1992 |
| EP | 474092 A2 * | 3/1992 |
| EP | 0 474 092 A2 | 11/1992 |
| EP | 0706850 | 10/1995 |
| EP | 0852167 | 12/1997 |
| EP | 706850 B1 * | 10/1999 |
| JP | 56059598 | 10/1979 |
| JP | 03264201 A * | 11/1991 |
| JP | 05140769 | 11/1991 |
| JP | 07266106 | 3/1994 |
| JP | 7 060 547 | 3/1995 |
| JP | EP7266106 * | 10/1995 |
| JP | 10193206 | 1/1997 |
| JP | 9 267 202 | 10/1997 |
| JP | 11320215 | 5/1998 |
| SU | 1144800 A | 3/1985 |
| WO | 9828464 | 7/1998 |
| WO | WO 00/34001 | 10/1999 |
| WO | WO02/22311 A1 | 9/2001 |
| WO | WO 02/22311 A1 * | 3/2002 |

OTHER PUBLICATIONS

Notification of transmittal of the International Search Report and Written Opinion (Mailed Jan. 20, 2005).

International Search Report'= (mailed Jan. 20, 2005).

Written Opinion of the International Searching Authority (mailed Jan. 20, 2005).

Notification of Transmittal of International Preliminary Report on Patentability for International Appl. No. PCT/US2004/017990 (mailed-May 31, 2005).

International Preliminary Report on Patentability for International Application No. PCT/US2004/017990 (mailed-May 31, 2005.

* cited by examiner

UNCOATED CUTTING TOOL USING BRAZED-IN SUPERHARD BLANK

BACKGROUND OF THE INVENTION

The present invention relates to a cutting tool that uses a superhard blank. More specifically, the present invention pertains to an uncoated cutting tool that uses a brazed-in polycrystalline cubic boron nitride (PcBN) blank or, in the alternative, a brazed-in polycrystalline diamond (PCD) blank.

Heretofore, there have been known cutting tools that use a superhard blank as the cutting element that provides a cutting edge. These cutting tools comprise a cutting tool body that contains a notch or pocket. The superhard blank is brazed into the notch, or pocket using a braze alloy so that a braze joint is formed between the superhard blank and the cutting tool body.

In one alternative, the superhard blank comprises a support (e.g. tungsten carbide) on which there is a layer of superhard material (e.g. polycrystalline cubic boron nitride or polycrystalline diamond). In another alternative, the superhard blank comprises a single piece of superhard material (e.g. polycrystalline cubic boron nitride or polycrystalline diamond). During the material removal operation, the superhard layer defines a cutting edge that comes into contact with the workpiece material to remove workpiece material so as to function as a cutting element.

During the material removal operation there is generated heat (and sometimes considerable) heat at the point of contact between the cutting edge of the superhard layer and the workpiece material. This is especially the case when the cutting tool uses a PcBN blank. Higher cutting temperatures also exist when using superhard blanks to remove material from workpiece material that is hard such as, for example, a D3 tool steel (AISI D3). Such a material has a hardness on the order of Rockwell C 60 wherein the quenched hardness can range between about 64 to about 66 Rockwell C and the tempered hardness can range between about 54 and about 61 Rockwell C. Higher cutting temperatures also exist in certain material removal operations such as threading, grooving, parting and some particularly difficult turning and milling operations.

Because of the generation of excessive heat, the use of cutting tools with a brazed-in superhard blank have experienced the drawback of the debrazing of the superhard blank from the cutting tool body. In other words, the heat generated at the point of contact between the superhard blank and the workpiece material passes through the superhard blank so as to cause the temperature at the braze joint to reach such a level that the braze alloy melts (or softens) thereby reducing the shear strength of the braze joint. A reduction in the shear strength of the braze joint weakens the braze joint so that the cutting forces exerted on the superhard blank can detach the superhard blank from the cutting tool body.

Dry cutting processes such as removing material by machining from carbon:carbon composite materials, abrasive-reinforced polymeric materials, and various types of wood materials through the use of cutting tools using a brazed-in PCD blank can also generate higher cutting temperatures. As mentioned earlier, these higher cutting temperatures result in a higher temperature at the braze joint. These higher temperatures at the braze joint can result in a softening or melting of the braze alloy thereby reducing the shear strength so as to cause the PCD blank to become detached or separated from the cutting tool body under the influence of the cutting forces exerted on the PCD blank.

The degree of the cutting forces exerted on the cutting tools taken in light of the cutting temperature, the temperature at the braze joint, the liquidus temperature of the braze alloy, and the shear strength of the braze alloy appear to influence the ability of the superhard blank to be retained in the pocket of the cutting tool. When the temperature at the braze joint reaches a certain level, there begins a reduction in the shear strength of the braze joint. When the shear strength of the braze joint is less than necessary to maintain its integrity against the cutting forces exerted on the superhard blank, the superhard blank becomes detached from the cutting tool body. As one can appreciate, the premature (or catastrophic) separation or detachment of the superhard blank from the cutting tool body is an undesirable result.

It would thus be desirable to provide an uncoated cutting tool that uses a brazed-in superhard blank as the cutting element that presents a cutting edge wherein the braze joint between the cutting tool body and the superhard blank is able to withstand the heat generated during the material removal operation.

It would also be desirable to provide an uncoated cutting tool that uses a brazed-in superhard blank as the cutting element that presents a cutting edge wherein the braze joint between the cutting tool body and the superhard blank is able to withstand the heat generated during the material removal operation through the use of braze alloys that maintain an adequate shear strength at the temperatures that exist at the braze joint during the material removal operation (i.e., high temperature braze alloys) so as to maintain the integrity of the braze joint.

It would further be desirable to provide an uncoated cutting tool that uses a brazed-in superhard blank as the cutting element that presents a cutting edge wherein the braze joint between the cutting tool body and the superhard blank is able to withstand the heat generated during the material removal operation through the use of high temperature braze alloys along with the geometry and design of the superhard blank so as to reduce the exposure of the braze joint to excessive temperatures so that the integrity of the brazed joint is maintained during the material removal operation.

Finally, it would be desirable to provide an uncoated cutting tool that uses a brazed-in superhard blank as the cutting element that presents a cutting edge wherein the braze joint between the cutting tool body and the superhard blank is able to withstand the heat generated during the material removal operation through the geometry and design of the superhard blank so as to reduce the exposure of the braze joint to excessive temperatures so that the integrity of the braze joint is maintained during the material removal operation.

SUMMARY OF THE INVENTION

In one form thereof, the invention is an uncoated cutting tool that includes a body containing a pocket. A polycrystalline cubic boron nitride blank is brazed into the pocket using a braze alloy. The braze alloy has a liquidus temperature of at least about 900 degrees Centigrade.

In another form thereof, the invention is an uncoated cutting tool that comprises a body containing a pocket. A polycrystalline cubic boron nitride blank is brazed into the pocket using a braze alloy. The braze alloy has a liquidus temperature of at least about 940 degrees Centigrade. The braze alloy comprises gold and nickel, and the gold being present in an amount ranging between about 65 weight percent and about 90 weight percent, and the nickel being present in an amount ranging between about 15 weight percent and about 25 weight percent.

In yet another form thereof, the invention is an uncoated cutting tool that comprises a body that contains a pocket. A polycrystalline cubic boron nitride blank is brazed into the pocket using a braze alloy. The braze alloy has a liquidus temperature of at least about 900 degrees Centigrade. The braze alloy comprises silver, copper and titanium, and the silver being present in an amount ranging between about 65 weight percent and about 75 weight percent, the copper being present in an amount ranging between about 20 weight percent and about 30 weight percent, and the titanium being present in an amount ranging between about 2.5 weight percent and about 6.5 weight percent.

In still another form thereof, the invention is an uncoated cutting tool for removing material from a workpiece in a material removal operation wherein the uncoated cutting tool engages the workpiece at a selected depth of cut. The uncoated cutting tool comprises a body that contains a pocket. A polycrystalline cubic boron nitride blank has a rake surface, a cutting edge and a leg that extends away from the cutting edge. The blank is brazed into the pocket using a braze alloy whereby there is a braze joint between the body and the polycrystalline cubic boron nitride blank. The braze alloy has a liquidus temperature of at least about 900 degrees Centigrade wherein the braze alloy is selected from the group comprising a nickel-gold braze alloy containing nickel and gold, a copper-gold braze alloy containing copper and gold, a gold-copper-nickel braze alloy contains gold and copper and nickel, a silver-titanium-copper braze alloy containing silver and titanium and copper, and a silver-palladium braze alloy containing silver and palladium. The braze joint is located a distance away from the rake surface of the polycrystalline cubic boron nitride blank ranging between about 1.5 millimeters and about 4.9 millimeters and the leg having a length that is at least about 1.7 times as great as the depth of cut.

In still another form thereof, the invention is an uncoated cutting tool for removing material from a workpiece in a material removal operation wherein the uncoated cutting tool comprises a body that contains a pocket. A superhard blank has a rake surface and a cutting edge wherein the blank is brazed into the pocket using a braze alloy whereby there is a braze joint between the body and the blank. The braze alloy has a liquidus temperature. The superhard blank engages the workpiece during the material removal operation so that cutting forces are exerted on the superhard blank and heat is generated at the cutting of the superhard blank. The braze joint is located a selected distance away from the cutting edge so that the temperature at the braze joint is less than the liquidus temperature of the braze alloy whereby the braze joint has sufficient shear strength to retain the superhard blank in the pocket during the material removal operation.

BRIEF DESCRIPTION OF THE DRAWINGS

The following is a brief description of the drawings that form a part of this patent application.

DETAILED DESCRIPTION OF THE INVENTION

Figure 1:
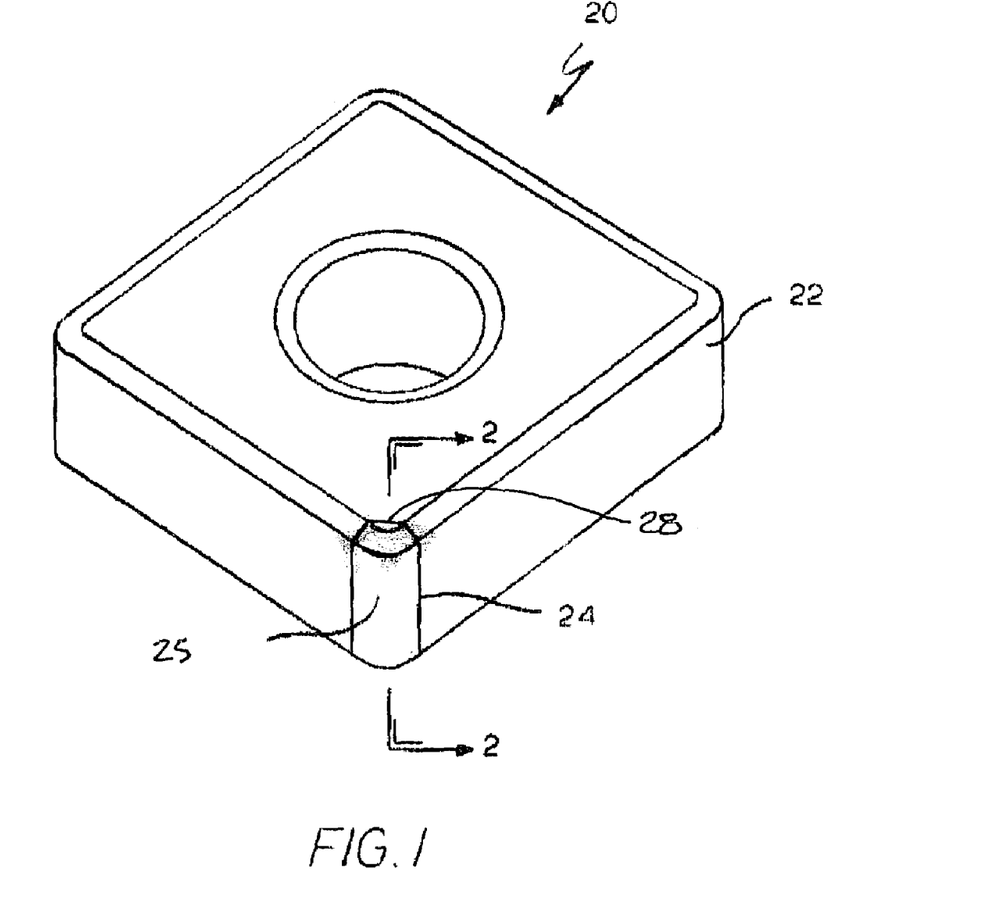
FIG. 1 is an isometric view of one embodiment of an uncoated cutting tool that comprises a body with a pocket or notch and an uncoated polycrystalline cubic boron nitride insert brazed therein.
Figure 2:
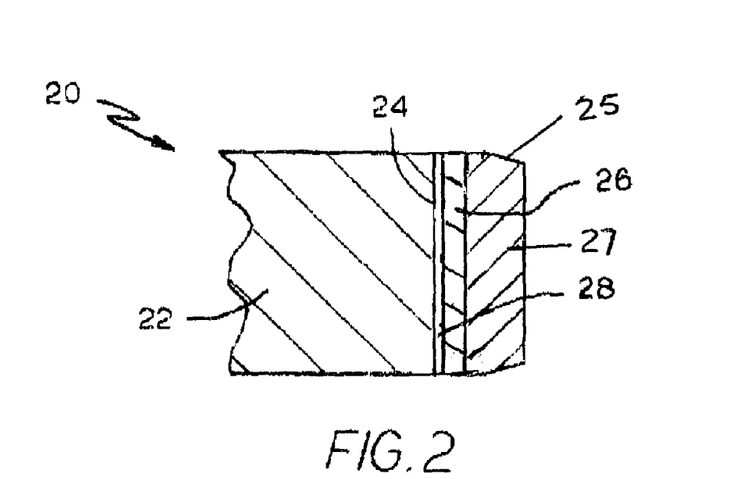
FIG. 2 is a cross-section view of the cutting tool of FIG. 1 taken along section line 2-2 of FIG. 1.

Referring to the drawings, FIGS. 1 and 2 illustrate one embodiment of the uncoated cutting tool generally designated as cutting tool 20.

Cutting tool 20 has a body 22 that contains a notch or pocket 24. The body 22 can be made from a number of materials, but one preferred material is cobalt cemented tungsten carbide. The notch 24 is located at one corner of the body 22, but it should be appreciated that the notch could be at opposite corners or at all four corners of the body 22.

A polycrystalline cubic boron nitride (PcBN) blank 25 is brazed to the body 22 at the notch 24. PcBN blank 25 comprises a cobalt tungsten carbide support 26 on which there is a layer of polycrystalline cubic boron nitride 27. Although specific compositions of PcBN will be set forth hereinafter, the typical PcBN material is a mixture of cubic boron nitride and another material such as, for example, titanium carbide or cobalt or some other suitable binder material. A braze joint 28 is at the juncture between the body 22 and the PcBN blank 25. As mentioned above, one objective of the invention is to provide an uncoated cutting tool that uses a brazed-in superhard blank wherein the braze joint between the cutting tool body and the PcBN blank is able to withstand the heat generated during the material removal operation. One way to accomplish this goal is to use a high temperature braze alloy. In this regard, one acceptable braze alloy for this application is a high temperature braze alloy in which the liquidus temperature (i.e., the lowest temperature at which the alloy is completely liquid) is at least about 900 degrees Centigrade. Braze alloys such as those identified in Table 1 hereof are suitable high temperature braze alloys.

Figure 3:
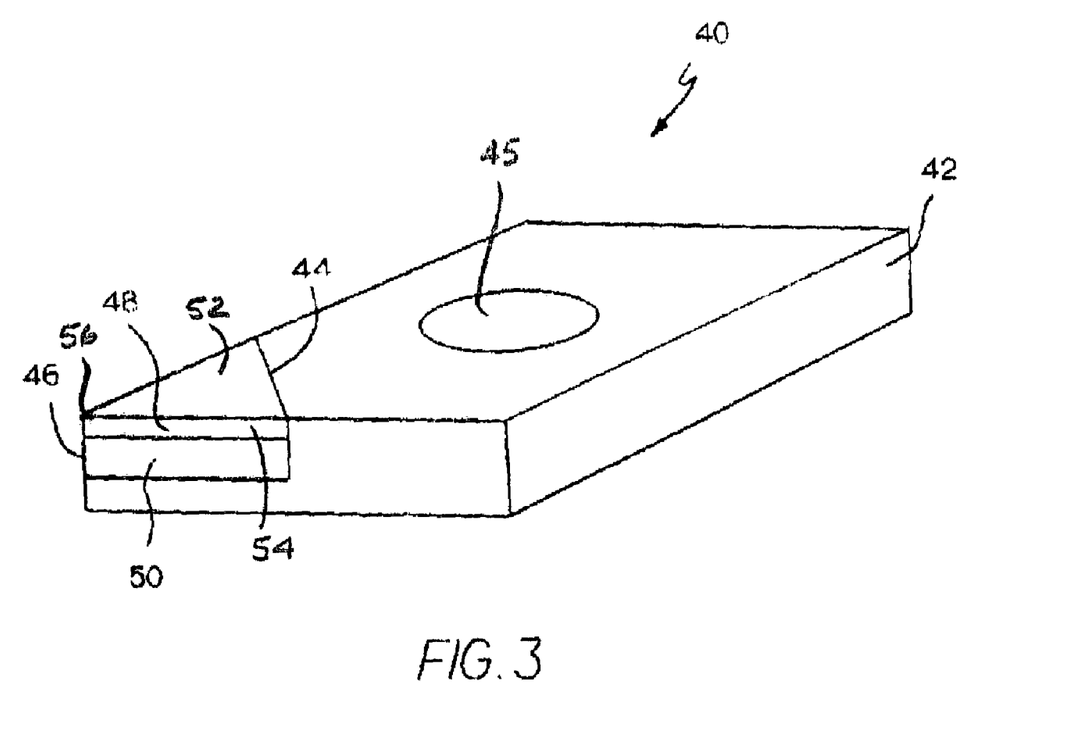
FIG. 3 is an isometric view of another embodiment of an uncoated cutting tool (i.e., a threading tool) that contains a pocket and an uncoated polycrystalline cubic boron nitride blank brazed therein wherein the blank comprises a layer of polycrystalline cubic boron nitride and a layer of tungsten carbide.

Referring to FIG. 3, there is shown another embodiment of an uncoated cutting tool generally designated as 40. Cutting tool 40 is one example of a threading tool. Cutting tool 40 includes a body 42 that contains a pocket 44 and an aperture 45. As discussed above with respect to the body 22 of cutting tool 20, the body 42 may be made from a number of materials including cobalt cemented tungsten carbide. An uncoated polycrystalline cubic boron nitride blank 46 is brazed within the pocket 44. The PcBN blank 46 comprises a PcBN layer 48 and a cemented carbide (e.g., cobalt cemented tungsten carbide) support 50. The PcBN blank 46 has a rake surface 52 and a flank surface 54. There is a cutting edge 56 at the intersection of the rake surface 52 and the flank surface 54.

Like for the cutting tool 20 of FIGS. 1 and 2, the composition of the PcBN layer may vary depending upon the specific application. KD050 is one specific composition for the PcBN layer wherein this composition comprises about 50 volume percent cubic boron nitride and about 50 volume percent titanium carbide. KD120 is another specific composition for the PcBN layer wherein this composition comprises about 88 volume percent cubic boron nitride and about 12 volume percent cobalt. The support 50 may also comprise any one of a variety of compositions depending upon the application. As mentioned above, one common material for the support 50 is cobalt cemented tungsten carbide.

Figure 4:
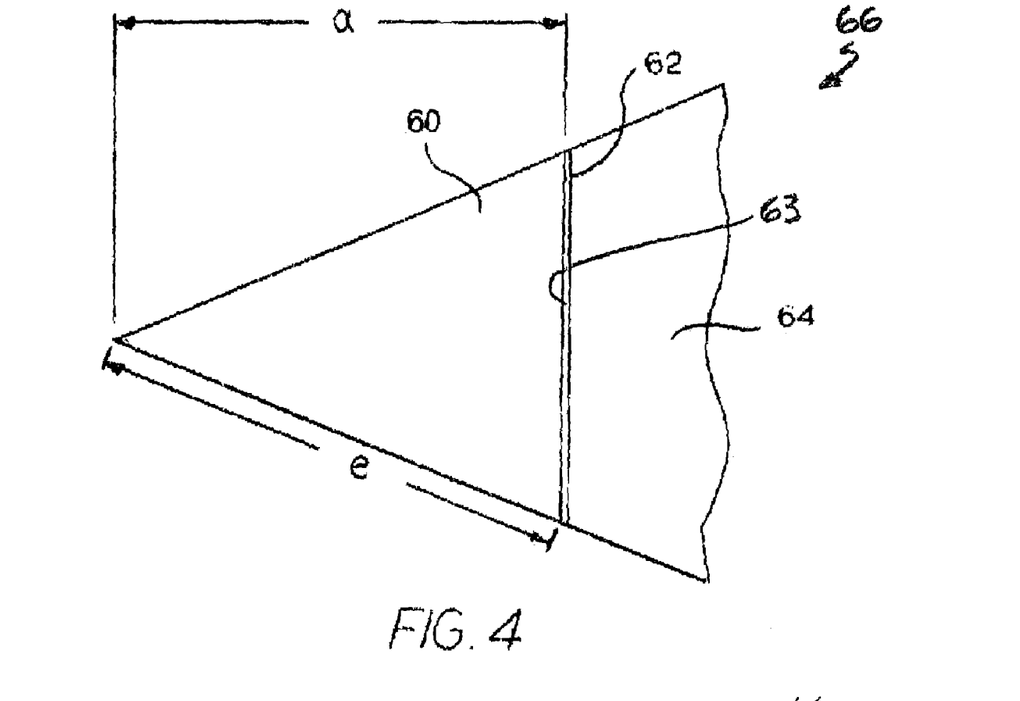
FIG. 4 is a top schematic view of a portion of an uncoated threading tool showing selected dimensions of the polycrystalline cubic boron nitride blank.
Figure 5:
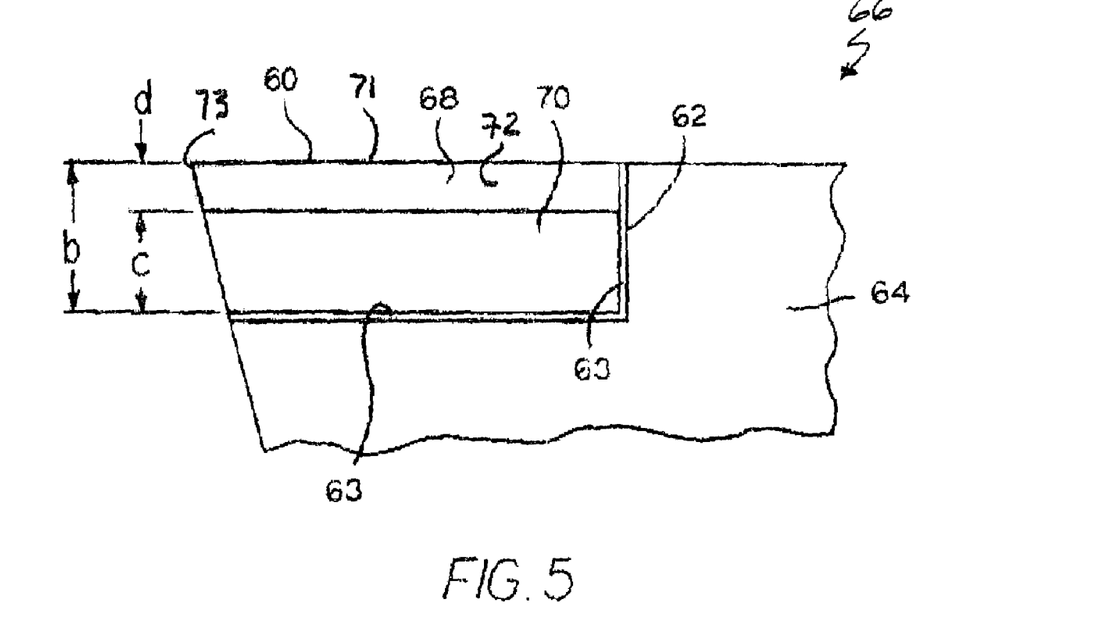
FIG. 5 is a side schematic view of the uncoated cutting tool of FIG. 4 showing selected dimensions of the polycrystalline cubic boron nitride blank.

Referring to FIGS. 4 and 5, there is shown in schematic form the arrangement of a PcBN blank 60 brazed into the pocket 62 of a body 64 for a threading tool generally designated as 66. The PcBN blank 60 comprises a layer of PcBN 68 and a cobalt cemented tungsten carbide support 70. There is a braze joint 63 between the PcBN blank 60 and the surfaces of the tool body 64 that define the pocket 62. The PcBN blank 60 has a rake surface 71 and a flank surface 72. A cutting edge 73 is at the intersection of the rake surface 71 and the flank surface 72.

As mentioned above, an objective of the present invention is to provide an uncoated cutting tool that has a brazed-in superhard (e.g., PcBN) blank wherein the braze joint between the cutting tool body and the PcBN blank is able to withstand the heat generated during the material removal operation. A way to optimize the ability of the braze joint to withstand the temperatures that exist at the braze joint during a cutting operation is to locate the braze joint an optimum distance away from the point of contact between the PcBN blank (i.e., the cutting edge) and the workpiece material.

The dimensions of the PcBN blank determine the distance between the point of contact and the braze joint. In the case of a superhard blank that comprises a PcBN layer on a cobalt cemented tungsten carbide support, the selection of these dimensions is based on balancing the cost of increasing the size of the layer of PCBN or increasing the size of the support (or a combination of increasing the size of the layer of PcBN and the size of the support) against the extent of thermal protection for the braze joint due to the distance between the point of contact and the braze joint. In the case of a superhard blank that is one piece of PcBN, the size (and hence the cost) of the PcBN piece is balanced against the extent of thermal protection of the braze joint due to the distance between the point of contact and the braze joint.

Figure 5A:
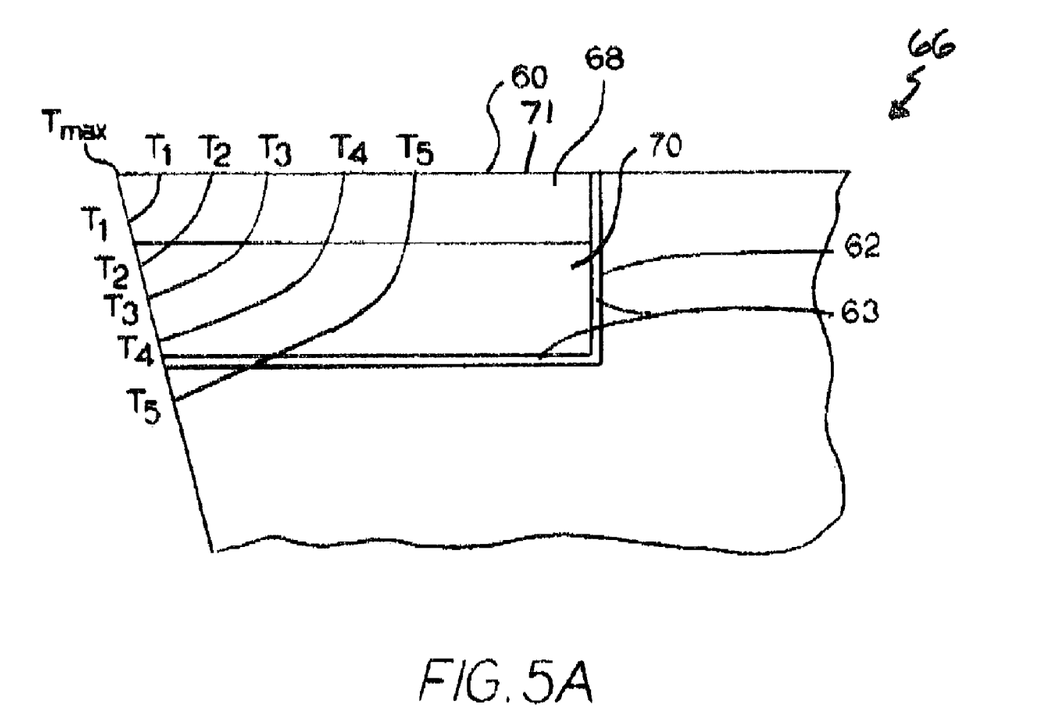
FIG. 5A is a side schematic view of the uncoated cutting tool of FIG. 4 that shows thermal gradients therein as would occur during a material removal operation

FIG. 5A is a schematic view that shows thermal gradient lines $T_{max}$ and $T_1$ through $T_5$ for the cutting tool as would occur during a material removal operation. The maximum temperature is ($T_{max}$) is at the point of contact between the cutting edge of the PcBN blank and the workpiece material. The temperature gradient lines $T_1$, $T_2$, $T_3$, $T_4$, and $T_5$ represent five different temperatures at various distances away from the point of contact. As one can appreciate, the temperature decreases as one moves farther away from the point of contact. The temperature gradient has the following relationship: $T_1 > T_2 > T_3 > T_4 > T_5$.

The braze joint 63 comprises the joint between the PcBN blank and the pocket contained in the cutting tool body wherein the braze joint has two principal portions. One portion is between the PcBN blank and the seating (or horizontal in FIG. 5A) surface of the pocket and the other portion is between the PcBN blank and the backing (or vertical on FIG. 5A) surface. These temperature gradient lines show that the braze joint 63 is exposed to the higher temperatures at a location near the point of contact and that the temperature decreases as one moves farther away from the point of contact. By selecting certain dimensions of the PcBN blank that impact upon the location of the braze joint relative to the cutting edge, one can select the temperature that exists at the braze joint or at least provide some degree of thermal protection for the braze joint. In the case of a superhard blank that comprises a support and a PcBN layer, the thickness of the support is typically increased since it is the least expensive component of these two components of the superhard blank. The extent to which the thickness of the support is increased depends upon the cutting temperatures and the properties (e.g., the liquidus temperature and the shear strength) of the particular braze alloy. The thickness of the support would be sufficient so that the temperature that exists at the braze joint, which in FIG. 5A would be about $T_5$, would be less than the liquidus temperature of the braze alloy and so that the braze alloy would possess sufficient shear strength so as to maintain the integrity of the braze joint so as to thereby retain the PcBN blank to the cutting tool body against the cutting forces that would be exerted on the PcBN blank.

In one embodiment as illustrated in FIGS. 4 and 5, the length "a" of the PcBN blank 60 is 0.190 inches (4.82 millimeters); the thickness "d" of the PcBN layer 68 is 0.030 inches (0.76 millimeters); the thickness "c" of the support 70 is 0.160 inches (4.1 millimeters); and the overall thickness "b" of the PcBN blank 60 is 0.190 inches (4.83 millimeters). The leg length of the superhard blank is dimension "e", and it equals about 0.220 inches (5.59 millimeters).

Set forth below in Table 1 are typical braze alloys useful for the brazing of the polycrystalline cubic boron nitride blanks to the body of the cutting tool.

TABLE 1

Examples of Useful High Temperature Braze Alloys

| Braze Alloy | Composition (weight percent) | Liquidus (Degrees Centigrade) | Solidus (Degrees Centigrade | Melting Point (Degrees Centigrade) | Shear Strength (pounds) |
| --- | --- | --- | --- | --- | --- |
| Gold-Copper | 50% Au 50% Cu | 969 | 954 | 954 | 13,752 |
| Gold-Copper-Nickel | 35% Au 62% Cu 3% Ni | 1028 | 973 | 973 | 12,844 |
| Gold-Copper | 37.5% Au 62.5% Cu | 1015 | 940 | 940 | 13,023 |
| Bau-4 Gold-Nickel | 82% Au 18% Ni | 948 | 948 | 948 | 21,686 |
| Bau-6 Gold- | 70% Au | 1045 | 1006 | 1006 | 26,670 |

TABLE 1-continued

Examples of Useful High Temperature Braze Alloys

| Braze Alloy | Composition (weight percent) | Liquidus (Degrees Centigrade) | Solidus (Degrees Centigrade) | Melting Point (Degrees Centigrade) | Shear Strength (pounds) |
|---|---|---|---|---|---|
| Nickel-Palladium | 22% Ni 8% Pd | | | | |
| Silver-Titanium | 68.8% Ag 26.7% Cu 4.5% Ti | 900 | 750 | 750 | Not Measured |
| Silver-Palladium | 95% Ag 5% Pd | 995 | 970 | 970 | Not Measured |

In the Table 1 above, the shear strength is reported in pounds and is the result of a test in which a one-half inch square carbide is brazed to a carbide member and the braze joint between these carbide members (i.e., a carbide-to-carbide braze joint) is placed in pure shear. The braze joint is continually loaded until failure and the result is given in the pounds at which the braze joint failed.

Cutting tools have been made using the above braze alloys wherein the PcBN layer of the blank comprises either the KD050 composition or the KD120 composition. In testing applicants have found that these cutting tools that have the brazed-in PcBN blank that use the high temperature braze alloys have shown improved performance results as compared to cutting tools that have brazed-in PcBN blanks that used a low temperature braze alloy (i.e., an alloy that has a liquidus equal to or less than 675 degrees (Centigrade). Along this line, applicants have found that the results are very good in the hard turning of hard steels such as AISI D3 tool steel that has a hardness in the range of about 60 Rockwell C wherein the quenched hardness can range between about 64 to about 66 Rockwell C and the tempered hardness can range between about 54 and about 61 Rockwell C.

As will become apparent from the discussion hereinafter, in some instances, applicants also contemplate using lower temperature braze alloys that have a liquidus temperature in the range of about 600 degrees Centigrade to about 650 degrees Centigrade (or about 750 degrees Centigrade) in conjunction with a cutting tool using a brazed-in superhard blank wherein the superhard blank has a geometry so that the braze joint between the cutting tool body and the superhard blank is not exposed to excessive temperatures during the material removal operation. As mentioned earlier, the dimensions of the PcBN blank determine the distance between the point of contact with the workpiece material and the braze joint so as to provide a degree of thermal protection for the braze joint. The extent to which the thickness of the support (or the PcBN layer) is increased depends upon the cutting temperatures as well as the properties of the particular braze alloy. These dimensions should be selected so that the temperature that exists at the braze joint would be less than the liquidus temperature of the braze alloy so that the braze alloy would possess sufficient shear strength so as to maintain the integrity of the braze joint thereby retaining the PcBN blank to the cutting tool body against the cutting forces that would be exerted on the PcBN blank. Table 2 below sets forth the properties of certain exemplary useful lower temperature braze alloys.

TABLE 2

Examples of Useful Lower Temperature Braze Alloys

| Braze Alloy | Composition (weight percent) | Liquidus (Degrees Centigrade) | Solidus (Degrees Centigrade) | Melting Point (Degrees Centigrade) | Shear Strength (pounds per square inch |
|---|---|---|---|---|---|
| Easy Flo 45 | 45% Ag 15% Cu 16% Zn 24 Cd | 620 | 605 | 605 | 8,191 |
| Braze 560 | 56% Ag 22% Cu 17% Zn 5% Sn | 650 | 620 | 620 | 11,196 |

Figure 6:
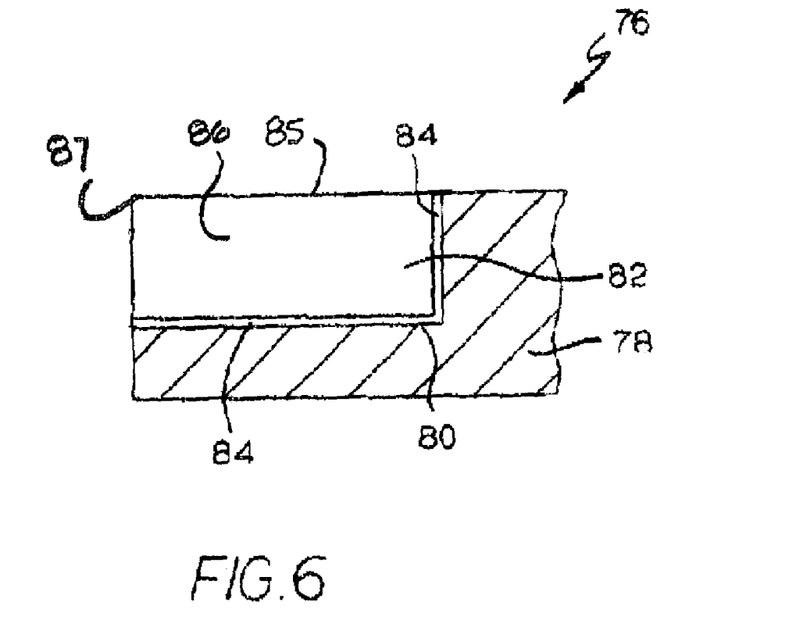
FIG. 6 is a cross-sectional view of a corner of an uncoated threading tool wherein the PcBN blank comprises one piece of PcBN material.

Referring to FIG. 6, there is shown a cross-sectional view of a cutting tool generally designated as 76. The cutting tool 76 has a cutting tool body 78 that contains a pocket 80. A PcBN blank 82 is brazed into the pocket 82 using a braze alloy so as to form a braze joint 84 between the PcBN blank and the surface that defines the pocket 80. The PcBN blank 82 comprises a single piece of polycrystalline cubic boron nitride. This is in contrast to a PcBN blank that has a layer of polycrystalline cubic boron nitride on a support. PcBN blank 82 has a rake surface 85 and a flank surface 86. The rake surface 85 and the flank surface 86 intersect to form a cutting edge 87.

Figure 7:
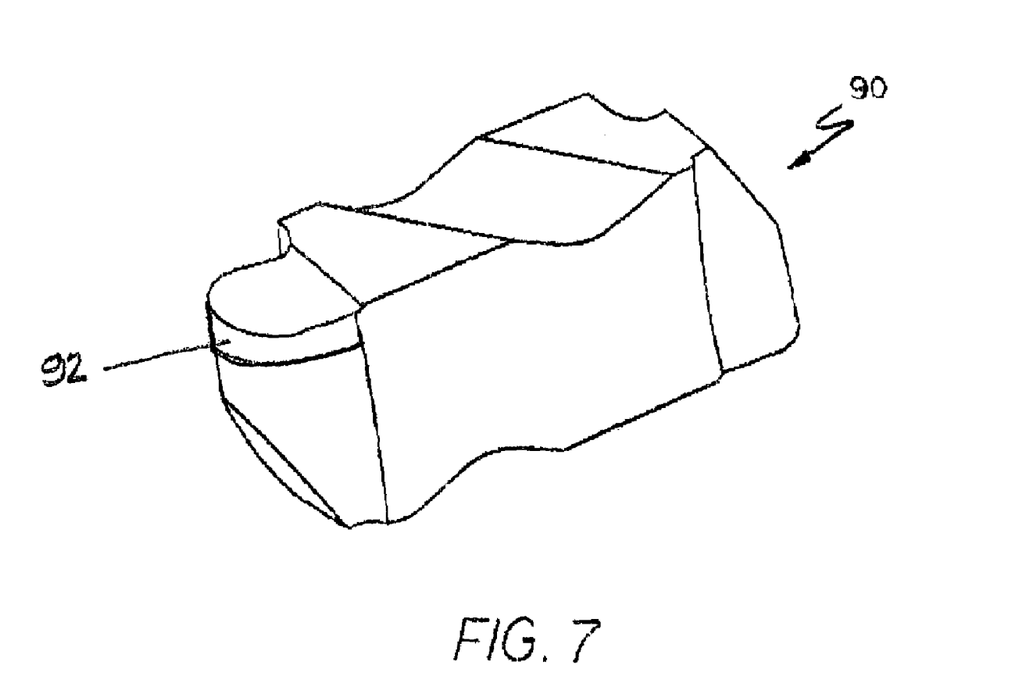
FIG. 7 is an isomeric view of an uncoated grooving tool that presents a TOP NOTCH® (TOP NOTCH® is a registered trademark of Kennametal Inc. of Latrobe, Pa. USA) style of geometry.

Referring to FIG. 7 there is shown a grooving tool 90 that has a PcBN blank 92 brazed to the body of the tool using a braze alloy. The grooving tool 90 is a TOP NOTCH® geometry wherein TOP NOTCH® is a registered trademark of Kennametal Inc. of Latrobe, Pa. USA.

Figure 8:
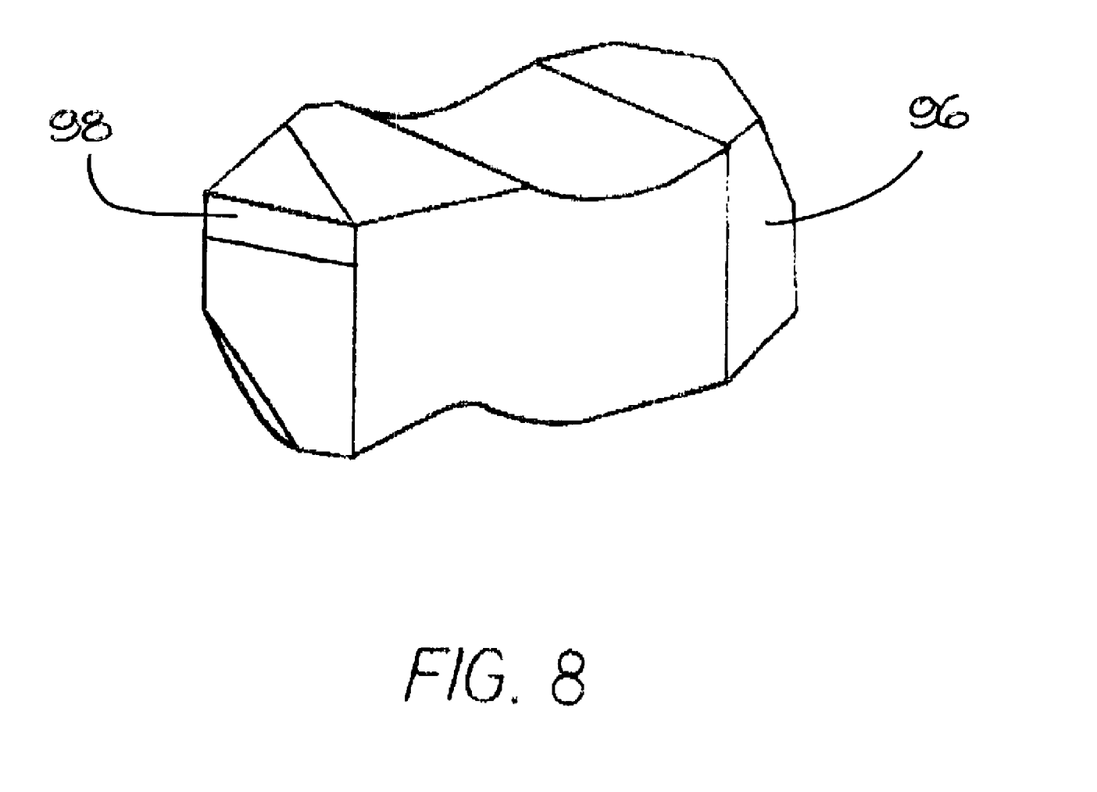
FIG. 8 is an isomeric view of an uncoated threading tool that presents a TOP NOTCH® (TOP NOTCH® is a registered trademark of Kennametal Inc. of Latrobe, Pa. USA) style of geometry.

Referring to FIG. 8 there is shown a threading tool 96 that has a PcBN blank 98 brazed to the body of the tool using a braze alloy. The threading tool 96 is a TOP NOTCH® geometry wherein TOP NOTCH® is a registered trademark of Kennametal Inc. of Latrobe, Pa. USA.

One specific method of threading that has provided excellent results when using these cutting tools (i.e., threading tools) is a constant volume threading method. In this method, the depth of the pass is constantly decreased so that the volume of material removed from the workpiece is constant for each pass. To achieve this constant volume one takes the infeed per pass formula: accumulated depth=initial depth of cut (doc)•(No. pass)$^{1/2}$ to arrive at the depth of cut for each pass. The Table 3 below sets forth an example of this method showing the first four passes. Additional passes determined per the calculation are necessary to obtain an external thread depth of 0.0789 inches.

TABLE 3

Sample Calculations for a Constant Volume Threading Method
[pitch external thread has a depth of .0789 inches]

| Pass No. | First Calculation | Second Calculation | Infeed depth of cut for the pass |
|---|---|---|---|
| 1 | 25% of .0798 = .0197 | NA | .0197 |
| 2 | .0197 • 2½ = .0278 | .0278 − .0197 = .0082 | .0082 |
| 3 | .0197 • 3½ = .0341 | .0341 − .0278 = .0063 | .0063 |
| 4 | .0197 • 4½ = .0394 | .0394 − .0341 = .0053 | .0053 |

The constant volume method can be described as a method of removing material in a threading operation from a workpiece comprising a ferrous alloy having a hardness between about 50 Rockwell C and about 65 Rockwell C using an uncoated cutting tool. The method has the following steps: providing an uncoated cutting tool having body containing a pocket where a superhard blank is brazed using a braze alloy into the pocket to form a braze joint wherein the braze alloy having a liquidus temperature of at least about 900 degrees Centigrade wherein the braze alloy is selected from the group comprising a nickel-gold braze alloy containing nickel and gold, a copper-gold braze alloy containing copper and gold, a gold-copper-nickel braze alloy contains gold and copper and nickel, a silver-titanium-copper braze alloy containing silver and titanium and copper, and a silver-palladium braze alloy containing silver and palladium; and engaging the workpiece with the uncoated cutting tool on multiple passes wherein each pass removes a volume of material that is substantially equal to the volume of material removed from the workpiece in the previous pass.

While the constant volume threading method is the preferred method of threading, applicants contemplate that one or more threading passes may remove either a lower volume of material than calculated per the formula or a lower volume of material than removed in the previous pass. Thus, such a method includes the step of engaging the workpiece with the uncoated cutting tool on multiple passes wherein each pass removes a volume of material substantially equal to or less than the volume of material removed from the workpiece in the previous pass.

Applicants note that there is a United States Patent Application by the same inventors filed on the same day as this patent application and entitled COATED CUTTING TOOL USING BRAZED-IN SUPERHARD BLANK.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. An uncoated cutting tool for removal of material from a metallic workpiece in a chipforming material removal operation, the uncoated cutting tool comprising:
   a body, the body containing a pocket;
   a polycrystalline cubic boron nitride blank, the blank being brazed into the pocket using a braze alloy; and
   the braze alloy having a liquidus temperature of at least about 1000 degrees Centigrade, and the braze alloy having at least about 50 weight percent of one of the following: silver or gold or copper.

2. The uncoated cutting tool of claim 1 wherein the braze alloy comprises gold and copper, and the gold being present in an amount ranging between about 30 weight percent and about 60 weight percent, and the copper being present in an amount ranging between about 40 weight percent and about 70 weight percent.

3. The uncoated cutting tool of claim 1 wherein the braze alloy further includes nickel, and the nickel being present in an amount between about 2 weight percent and about 7 weight percent.

4. The uncoated cutting tool of claim 3 wherein the braze alloy comprises between about 35 weight percent to about 40 weight percent gold, between about 60 weight percent and about 65 weight percent copper, and between about 1 weight percent and about 5 weight percent nickel.

5. The uncoated cutting tool of claim 1 wherein the braze alloy comprises between about 30 weight percent and about 40 weight percent gold and between about 60 weight percent and about 70 weight percent copper.

6. The uncoated cutting tool of claim 1 wherein the braze alloy consisting essentially of about 37.5 weight percent gold and about 62.5 weight percent copper.

7. The uncoated cutting tool of claim 1 wherein the braze alloy consisting essentially of between about 90 weight percent and about 98 weight percent silver and about 2 weight percent and about 10 weight percent palladium.

8. The uncoated cutting tool of claim 7 wherein the braze alloy consisting essentially of between about 93 weight percent and about 97 weight percent silver and about 3 weight percent and about 7 weight percent palladium.

9. An uncoated cutting tool for removal of material from a metallic workpiece in a chipforming material removal operation, the uncoated cutting tool comprising:
   a body, the body containing a pocket;
   a polycrystalline cubic boron nitride blank, the blank being brazed into the pocket using a braze alloy;
   the braze alloy having a liquidus temperature of at least about 940 degrees Centigrade, and the braze alloy comprises between about 65 weight percent to about 75 weight percent gold, between about 20 weight percent and about 25 weight percent nickel, and between about 5 weight percent and about 10 weight percent palladium.

10. The uncoated cutting tool of claim 9 wherein the braze comprises about 70 weight percent gold, about 22 weight percent nickel, and about 8 weight percent palladium.

11. The uncoated cutting tool of claim 9 wherein the liquidus temperature of the braze alloy is at least about 1040 degrees Centigrade.

12. An uncoated cutting tool for removal of material from a metallic workpiece in a chipforming material removal operation, the uncoated cutting tool comprising:
   a body, the body containing a pocket;
   a polycrystalline cubic boron nitride blank, the blank being brazed into the pocket using a braze alloy;
   the braze alloy having a liquidus temperature of at least about 900 degrees Centigrade, and the braze alloy comprises silver, copper and titanium, and the silver being present in an amount ranging between about 68 weight percent and about 70 weight percent, the copper being present in an amount ranging between about 26 weight percent and about 28 weight percent, and the titanium being present in an amount ranging between about 4 weight percent and about 5 weight percent.

13. An uncoated cutting tool for removing material from a metallic workpiece in a chipforming material removal operation wherein the uncoated cutting tool engages the workpiece at a selected depth of cut, the uncoated cutting tool comprising:

a body, the body containing a pocket;

a polycrystalline cubic boron nitride blank having a rake surface, a cutting edge and a leg extending away from the cutting edge;

the blank being brazed into the pocket using a braze alloy whereby there is a braze joint between the body and the polycrystalline cubic boron nitride blank;

the braze alloy having a liquidus temperature of at least about 900 degrees Centigrade wherein the braze alloy is selected from the group comprising a nickel-gold braze alloy containing nickel and gold, a copper-gold braze alloy containing copper and gold, a gold-copper-nickel braze alloy contains gold and copper and nickel, a silver-titanium-copper braze alloy containing silver and titanium and copper, and a silver-palladium braze alloy containing silver and palladium; and the braze joint being located a distance away from the rake surface of the polycrystalline cubic boron nitride blank ranging between about 1.5 millimeters and about 4.9 millimeters and the leg having a length that is at least about 1.7 times as great as the depth of cut.

14. The uncoated cutting tool of claim 13 wherein the braze alloy having a liquidus temperature of at least about 960 degrees Centigrade, and the braze alloy comprises gold and copper, and the gold being present in an amount ranging between about 30 weight percent and about 60 weight percent, and the copper being present in an amount ranging between about 40 weight percent and about 70 weight percent.

15. The uncoated cutting tool of claim 14 wherein the braze alloy further includes nickel, and the nickel being present in an amount between about 2 weight percent and about 7 weight percent.

16. The uncoated cutting tool of claim 13 wherein the braze alloy consisting essentially of between about 50 weight percent gold and about 50 weight percent copper.

17. The uncoated cutting tool of claim 13 wherein the braze alloy consisting essentially of between about 37.5 weight percent gold and about 62.5 weight percent copper.

18. The uncoated cutting tool of claim 13 wherein the braze alloy having a liquidus temperature of at least about 940 degrees Centigrade, and the braze alloy comprises gold and nickel, and the gold being present in an amount ranging between about 65 weight percent and about 90 weight percent, and the nickel being present in an amount ranging between about 15 weight percent and about 25 weight percent.

19. The uncoated cutting tool of claim 18 wherein the braze alloy further includes palladium, and the palladium being present in an amount between about 5 weight percent and about 15 weight percent.

20. The uncoated cutting tool of claim 13 wherein the braze alloy comprises between about 80 weight percent and about 85 weight percent gold and between about 15 weight percent and about 20 weight percent nickel.

21. The uncoated cutting tool of claim 13 wherein the braze alloy consisting essentially of between about 90 weight percent and about 98 weight percent silver and about 2 weight percent and about 10 weight percent palladium.

22. The uncoated cutting tool of claim 12 wherein the braze alloy consisting essentially of between about 93 weight percent and about 97 weight percent silver and about 3 weight percent and about 7 weight percent palladium.

23. The uncoated cutting tool of claim 1 wherein the polycrystalline cubic boron nitride blank comprises a cemented carbide support and a layer of polycrystalline cubic boron nitride on the cemented carbide support, and a braze joint of the braze alloy being between the cemented carbide support and the body.

24. An uncoated cutting tool for removal of material from a metallic workpiece in a chipforming material removal operation, the uncoated cutting tool comprising: a body, the body containing a pocket; a polycrystalline cubic boron nitride blank, the blank being brazed into the pocket using a braze alloy; the braze alloy having a liquidus temperature of at least about 940 degrees Centigrade, and the braze alloy comprises gold, and nickel and the gold being present in an amount ranging between about 65 weight percent and about 90 weight percent, and the nickel being in an amount ranging between about 15 weight percent and about 25 weight percent, wherein the polycrystalline cubic boron nitride blank comprises a cemented carbide support and a layer of polycrystalline cubic boron nitride on the cemented carbide support, and a braze joint of the braze alloy being between the cemented carbide support and the body.

25. An uncoated cutting tool of material from a metallic workpiece in a chipforming material removal operation, the uncoated cutting tool comprising: a body, the body containing a pocket; a polycrystalline cubic boron nitride blank, the blank being brazed into the pocket using a braze alloy; the braze alloy having a liquidus temperature of at least about 900 degrees Centigrade, and the braze alloy comprises silver, copper and titanium, and the silver being present in an amount ranging between about 65 weight percent and about 75 weight percent, the copper being present in an amount ranging between about 20 weight percent and about 30 weight percent, and the titanium being present in an amount ranging between about 2 weight percent and about 6 weight percent, wherein the polycrystalline cubic boron nitride blank comprises a cemented carbide support and a layer of polycrystalline cubic boron nitride on the cemented carbide support, and a braze joint of the braze alloy being between the cemented carbide support and the body.

26. The uncoated cutting tool of claim 13 wherein the polycrystalline cubic boron nitride blank comprises a cemented carbide support and a layer of polycrystalline cubic boron nitride on the cemented carbide support, and the braze joint being between the cemented carbide support and the body.

* * * * *